(12) United States Patent
Suzuki

(10) Patent No.: US 10,804,555 B2
(45) Date of Patent: Oct. 13, 2020

(54) HONEYCOMB-SHAPED REACTION VESSEL

(71) Applicant: KABUSHIKI KAISHA TOYOTA CHUO KENKYUSHO, Nagakute-shi, Aichi (JP)

(72) Inventor: Tadashi Suzuki, Nagakute (JP)

(73) Assignee: KABUSHIKI KAISHA TOYOTA CHUO KENKYUSHO, Nagakute-shi (JP)

( * ) Notice: Subject to any disclaimer, the term of this patent is extended or adjusted under 35 U.S.C. 154(b) by 0 days.

(21) Appl. No.: 16/382,720

(22) Filed: Apr. 12, 2019

(65) Prior Publication Data
US 2019/0319286 A1    Oct. 17, 2019

(30) Foreign Application Priority Data

Apr. 13, 2018 (JP) ................................. 2018-077757

(51) Int. Cl.
*H01M 8/0612* (2016.01)
(52) U.S. Cl.
CPC ..... *H01M 8/0631* (2013.01); *C01B 2203/066* (2013.01)

(58) Field of Classification Search
CPC ... F01N 3/10; H01M 8/0631; C01B 2203/066
USPC .......................................................... 422/177
See application file for complete search history.

(56) References Cited

U.S. PATENT DOCUMENTS

2001/0026838 A1* 10/2001 Dettling .................. B01J 23/63
427/230
2017/0175609 A1* 6/2017 Masoudi ............... F01N 3/2842

FOREIGN PATENT DOCUMENTS

JP    2007-268484 A    10/2007
JP    2017-176939 A    10/2017

* cited by examiner

*Primary Examiner* — Tom P Duong
(74) *Attorney, Agent, or Firm* — Oliff PLC

(57) ABSTRACT

A honeycomb-shaped reaction vessel, comprising:
  a honeycomb-shaped substrate; and
  a reaction layer arranged in at least a portion of an inner wall of a cell of the honeycomb-shaped substrate dividedly in a direction along an inner circumference of the cell and dividedly in a longitudinal direction of the cell.

10 Claims, 6 Drawing Sheets

HONEYCOMB-SHAPED REACTION VESSEL

BACKGROUND OF THE INVENTION

Field of the Invention

The present invention relates to a honeycomb-shaped reaction vessel. More specifically, the present invention relates to a honeycomb-shaped reaction vessel comprising a reaction layer in a cell of a honeycomb-shaped substrate.

Related Background Art

Reaction vessels including catalysts for purification of exhaust gas used for automobiles and the like, solid oxide fuel cells (SOFCs) used for fuel cells and the like, cells for secondary batteries, and reaction vessels used for various synthesis apparatuses each comprise: a honeycomb-shaped substrate having multiple through-holes; and a reaction layer made of a material, such as a catalyst material, an active material, an electrode material, a buffer material, or an adsorption material, applied in cells of the honeycomb-shaped substrate. In such a reaction vessel, a single-layered reaction layer formed by applying a single material has been conventionally used as the reaction layer. To improve various performances, a multi-layer type or lamination type reaction layer have recently been used in which multiple reaction layers formed by applying multiple materials and having different compositions are distributed in a direction (a lateral direction or radial direction of a cell) perpendicular to a flow direction of a reaction fluid (for example, Japanese Unexamined Patent Application Publication No. 2007-268484 (Patent Document 1)).

However, the honeycomb-shaped reaction vessel comprising a multi-layer type or lamination type reaction layer has the following problems: one of the multiple reaction layers may inhibit a function of another reaction layer; or the multiple reaction layers may mutually inhibit their functions. For example, a honeycomb-shaped reaction vessel in which a Rh catalyst-containing reaction layer is laminated on a Pd catalyst-containing reaction layer has the following problem. Specifically, when the honeycomb-shaped reaction vessel is exposed to high temperature for a long period or used for an extended period, the Pd catalyst, which has low heat resistance, tends to undergo grain growth to form large Pd catalyst particles. Moreover, since Rh has the same crystal structure as Pd, solid-dissolution of Rh in Pd easily occurs. Therefore, when the Pd catalyst which has undergone grain growth is present near the Rh catalyst, solid-dissolution of the Rh catalyst into the Pd catalyst particles which have undergone grain growth occurs because of thermal diffusion, and the NO removal performance of the Rh catalyst may deteriorate. Moreover, when a Pd catalyst is supported on a ceria-zirconia solid solution, solid-dissolution of the Rh catalyst into the ceria-zirconia solid solution also occurs. This causes a problem of further deterioration in NO removal performance of the Rh catalyst.

Meanwhile, Japanese Unexamined Patent Application Publication No. 2017-176939 (Patent Document 2) discloses a honeycomb-shaped catalyst comprising catalyst layers of two or more types arranged on an inner wall of each cell of a honeycomb-shaped substrate dividedly in a direction along an inner circumference of the cell. Patent Document 2 also discloses that the honeycomb-shaped catalyst has an improved catalytic performance in comparison with a honeycomb-shaped catalyst comprising a conventional mixed catalyst layer formed by mixing multiple catalyst materials.

However, in the honeycomb-shaped catalyst described in Patent Document 2, the catalyst layers are arranged such that their compositions are constant in the flow direction of the reaction fluid. Hence, when the reaction fluid passes through a cell as a laminar flow, the reaction fluid comes into contact with only one of the catalyst layers, and does not come into contact with the other catalyst layer. Therefore, in order to obtain an effect owing to the arrangement of the catalyst layers of two or more types, it is necessary to control the flow of the reaction fluid.

SUMMARY OF THE INVENTION

The present invention has been made in view of the above-described problems of the conventional techniques, and an object of the present invention is to provide a honeycomb-shaped reaction vessel which is less likely to undergo deterioration in a performance of a reaction layer, even when exposed to high temperature for a long period.

The present inventor has conducted intensive study to achieve the above-described object, and consequently found that when a reaction layer is arranged in at least a portion of an inner wall of a cell of the honeycomb-shaped substrate dividedly in a direction along an inner circumference of the cell and dividedly in a longitudinal direction of the cell, the deterioration in a performance of the reaction layer is suppressed, even when the reaction layer is exposed to high temperature for a long period. This finding has led to the completion of the present invention.

Specifically, the honeycomb-shaped reaction vessel of the present invention comprises:

a honeycomb-shaped substrate; and a reaction layer arranged in at least a portion of an inner wall of a cell of the honeycomb-shaped substrate dividedly in a direction along an inner circumference of the cell and dividedly in a longitudinal direction of the cell.

In the honeycomb-shaped reaction vessel, the reaction layer is preferably arranged in the at least a portion of the inner wall of the cell of the honeycomb-shaped substrate helically in the longitudinal direction of the cell.

In addition, in the honeycomb-shaped reaction vessel of the present invention, the reaction layer preferably comprises reaction layers of two or more types, and the reaction layers of two or more types are more preferably arranged in the at least a portion of the inner wall of the cell of the honeycomb-shaped substrate multiple-helically in the longitudinal direction of the cell.

Moreover, in the honeycomb-shaped reaction vessel of the present invention, a width of the reaction layer (a length in the longitudinal direction of the cell on a surface of the reaction layer) is preferably exceeding 0 mm and 5 mm or less. It is also preferred that the reaction layer comprises reaction layers of two or more types, and a pitch between adjacent reaction layers (a distance in the longitudinal direction of the cell between centers on surfaces of adjacent reaction layers) is exceeding 0 mm and 5 mm or less.

Furthermore, in the honeycomb-shaped reaction vessel of the present invention, the reaction layer preferably comprises a catalyst material.

Note that although it is not exactly clear why even when the honeycomb-shaped reaction vessel of the present invention is exposed to high temperature for a long period, the deterioration in a performance of the reaction layer is suppressed, the present inventor speculates as follows. Specifically, in the honeycomb-shaped reaction vessel of the present invention, the reaction layer is arranged dividedly in both the direction along the inner circumference of the cell and the longitudinal direction of the cell. Hence, for example, when the reaction layer comprises reaction layers of two or more types, the reaction of the materials constituting the reaction layers with each other is suppressed, or the thermal diffusion of one of the materials to the other is suppressed. The present inventor speculates that, for this reason, the deterioration in a performance of each reaction layer is suppressed. Moreover, in the honeycomb-shaped reaction vessel of the present invention, the reaction layer is arranged dividedly not only in the direction along the inner circumference of the cell but also in the longitudinal direction of the cell. Hence, for example, when the reaction layer comprises reaction layers of two or more types, and the flow of a fluid such as a reaction substrate gas remains laminar, the fluid comes into contact with reaction layers of at least two types. The present inventor speculates that, for this reason, the effect owing to the arrangement of the reaction layers of two or more types is sufficiently exhibited.

According to the present invention, it is possible to obtain a honeycomb-shaped reaction vessel which is less likely to undergo deterioration in a performance of a reaction layer, even when exposed to high temperature for a long period.

DETAILED DESCRIPTION OF THE PREFERRED EMBODIMENTS

Figure 1:
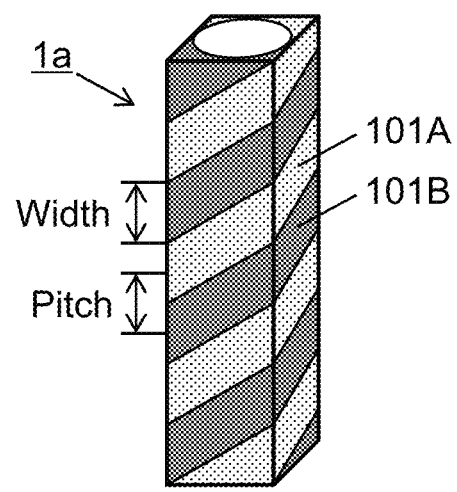
FIG. 1 is a perspective view schematically showing a preferred embodiment of a cell in a honeycomb-shaped reaction vessel of the present invention.

Hereinafter, the present invention is described based on preferred embodiments thereof.

A honeycomb-shaped reaction vessel of the present invention comprises:
a honeycomb-shaped substrate; and
a reaction layer arranged in at least a portion of an inner wall of a cell of the honeycomb-shaped substrate dividedly in a direction along an inner circumference of the cell and dividedly in a longitudinal direction of the cell.

(Honeycomb-Shaped Substrate)

The honeycomb-shaped substrate used in the present invention is not particularly limited, as long as the honeycomb-shaped substrate has multiple cells (flow paths for a fluid or gas) defined by partition walls. It is preferred to use a monolithically formed known honeycomb-shaped substrate from the viewpoint that a strength of the honeycomb-shaped substrate can be sufficiently obtained. On the other hand, if a honeycomb-shaped substrate which is not monolithically formed is used, specifically, a honeycomb-shaped substrate which is assembled with multiple members is used, a strength of the honeycomb-shaped substrate can be insufficiently obtained. Therefore, a structure reliability tends to degrade. Particularly, if a honeycomb-shaped reaction vessel having a desired length is formed by arranging honeycomb-shaped members having a reaction layer in multistage in a longitudinal direction of the cell, the honeycomb-shaped reaction vessel lacks continuity between adjacent honeycomb-shaped members, and hence a flow of a fluid such as a reaction substrate gas become a turbulent flow in a joint between the honeycomb-shaped members. Therefore, the pressure drop tends to increase.

In addition, a cross-sectional shape of each cell in a direction perpendicular to the longitudinal direction (a flow direction of a fluid) of the cell is not particularly limited, and examples thereof include polygonal shapes (preferably regular polygonal shapes) such as a quadrilateral shape (preferably a square shape) and a hexagonal shape (preferably a regular hexagonal shape), a circular shape, an elliptical shape, and the like.

A material of the honeycomb-shaped substrate is not particularly limited, and examples thereof include cordierite, silicon carbide, mullite, alumina, aluminum titanate, silicon nitride, stainless steel, 20% Cr-5% Al alloy stainless steel, and the like. Particularly when the honeycomb-shaped reaction vessel of the present invention is used as a catalyst for purification of exhaust gas for automobiles, a honeycomb-shaped cordierite substrate or a stainless steel foil substrate is preferable.

(Reaction Layer)

A material constituting the reaction layer according to the present invention is not particularly limited, and examples thereof include catalyst materials, active materials, electrode materials, buffer materials, adsorption materials, and the like.

Examples of the catalyst materials include, but are not limited to, noble metals (for example, rhodium (Rh), palladium (Pd), platinum (Pt)), basic materials (for example, barium (Ba)), oxide supports (for example, alumina, zirconia, silica, titania, rare earth oxides (ceria, lanthanum oxide, and the like), transition metal oxides (iron oxide and the like), composite oxides containing two or more thereof (ceria-zirconia composite oxide, zeolite, and the like)), and the like. Examples of the electrode materials include, but are not limited to, powder materials (pastes) of transition metals such as aluminum, nickel, and silver, carbon, and the like. Examples of the buffer materials and adsorption materials include, but are not limited to, alumina, silica, zeolite, mesoporous materials, various clay minerals, and the like.

In the honeycomb-shaped reaction vessel of the present invention, a reaction layer formed by using such a material is arranged in at least a portion of an inner wall of each cell of the honeycomb-shaped substrate in a state of being divided in a direction along an inner circumference (hereinafter, also referred to as "inner-circumferential direction") of the cell and divided in a longitudinal direction of the cell. In the honeycomb-shaped reaction vessel of the present invention, the reaction layer may comprise a reaction layer of a single type or reaction layers of two or more types.

For example, when the reaction layer comprises reaction layers of two or more types, and the reaction layers of two or more types are arranged in a state of being divided in the inner-circumferential direction of the cell and divided in the longitudinal direction of the cell, the reaction of the materials constituting the reaction layers with each other is suppressed, or the thermal diffusion of one of the materials to the other is suppressed. For this reason, the deterioration in a performance of each reaction layer can be suppressed. Moreover, when each of the reaction layers of two or more types is arranged in a state of being divided in multiple positions in the longitudinal direction of the cell, a synergetic effect due to the reaction layers of two or more types can be obtained.

On the other hand, if reaction layers of two or more types are laminated, the reaction of the materials constituting the reaction layers with each other occurs, or the thermal diffusion of one of the materials to the other occurs. For this reason, a performance of each reaction layer is likely to deteriorate, and the performance of the reaction layer is insufficiently exhibited. In addition, if the reaction layers of two or more types are arranged in a state of being divided in the longitudinal direction of the cell and each are arranged in a single position, a synergetic effect due to the reaction layers of two or more types is insufficiently obtained, and a performance of reaction layer may be insufficiently exhibited.

When the reaction layers of two or more types according to the present invention are each made of different catalyst materials, a combination of the catalyst materials (the catalyst layers) of two or more types is not particularly limited. The combination is preferably a combination of catalyst materials (catalyst layers made of the catalyst materials) which, when mixed with each other, do not sufficiently exhibit their catalytic performances, because a high-temperature heat treatment of oxidation/reduction causes diffusion, solid-dissolution, reaction, sintering (grain growth), or the like of the catalyst materials, so that the active sites or the specific surface area decreases, or the melting point is lowered. The combination is more preferably a combination of a catalyst material (catalyst layer) containing rhodium (Rh) and a catalyst material (catalyst layer) containing palladium (Pd), a combination of a catalyst material (catalyst layer) containing rhodium (Rh) and a catalyst material (catalyst layer) containing platinum (Pt), a combination of a catalyst material (catalyst layer) containing rhodium (Rh) and a catalyst material (catalyst layer) containing ceria, a combination of a catalyst material (catalyst layer) containing rhodium (Rh) and a catalyst material (catalyst layer) containing iron oxide, a combination of a catalyst material (catalyst layer) containing ceria and a catalyst material (catalyst layer) containing iron oxide, a combination of a catalyst material (catalyst layer) containing alumina and a catalyst material (catalyst layer) containing iron oxide, or a combination of a catalyst material (catalyst layer) containing titania and a catalyst material (catalyst layer) containing alumina. Such a combination of catalyst materials (catalyst layers) exhibits a better catalytic performance in a case where these catalyst materials are each independently used to form catalyst layers of two or more types in a state of being divided in the inner-circumferential direction of the cell and divided in the longitudinal direction of the cell than in a case where the catalyst materials are mixed with each other for the following reason. Specifically, even when the catalyst materials are subjected to a high-temperature heat treatment of oxidation/reduction, the diffusion, solid-dissolution, reaction, sintering (grain growth), or the like of the catalyst materials is less likely to occur, so that the decrease in active sites and specific surface area and the lowering of melting point are suppressed in the former case.

Moreover, the combination of two or more catalyst materials (catalyst layers) according to the present invention is also preferably a combination of catalyst materials which easily undergoes coking, when the catalyst materials are mixed with each other. The combination is more preferably a combination of a catalyst material (catalyst layer) containing a noble metal and a catalyst material (catalyst layer) containing silica, or a combination of a catalyst material (catalyst layer) containing a noble metal and a catalyst material (catalyst layer) containing zeolite. Such a combination of catalyst materials exhibits a better catalytic performance (for example, hydrocarbon (HC) adsorbability) in a case where these catalyst materials are used each independently to form catalyst layers of two or more types in a state of being divided in the inner-circumferential direction of the cell and divided in the longitudinal direction of the cell than in a case where the catalyst materials are mixed with each other, because the coking is less likely to occur in the former case.

Moreover, the combination of two or more catalyst materials (catalyst layers) according to the present invention is also preferably a combination of catalyst materials which easily undergoes the diffusion, migration, or reaction of the catalyst materials, when the catalyst materials are mixed with each other. The combination is more preferably a combination of a catalyst material (catalyst layer) containing a basic material and a catalyst material (catalyst layer) containing a noble metal. Such a combination of catalyst materials exhibits a better catalytic performance (for example, NOx adsorbability or NOx removal performance) in a case where the catalyst materials are used each independently to form catalyst layers of two or more types in a state of being divided in the inner-circumferential direction of the cell and divided in the longitudinal direction of the cell than in a case where the catalyst materials are mixed with each other, because the diffusion, migration, or reaction of the catalyst materials is less likely to occur in the former case.

Moreover, when the reaction layers of two or more types according to the present invention are each made of different functional materials, the combination of the functional materials of two or more types is not particularly limited, and examples thereof include combinations of a catalyst material (active layer) and an adsorption material (adsorption material layer). The combination is preferably a combination of an active layer comprising a noble metal and a support therefor and an adsorption material layer of zeolite, mordenite, or the like. The layers of two or more types made of these functional materials are each arranged in a state of being divided in the inner-circumferential direction of the cell and divided in the longitudinal direction of the cell.

Moreover, when the reaction layers of two or more types according to the present invention are each made of different electrode materials, the combination of the electrode materials (electrically conductive layers) of two or more types is not particularly limited, and examples thereof include combinations of a transition metal material and carbon. The electrically conductive layers of two or more types made of these electrode materials are each arranged in a state of being divided in the inner-circumferential direction of the cell and divided in the longitudinal direction of the cell.

The lower limit of a width of such a reaction layer (a length in the longitudinal direction of the cell on the reaction layer surface) is preferably exceeding 0 mm, more preferably 0.5 mm or more, further preferably 1 mm or more, and particularly preferably 2 mm or more. The upper limit thereof is preferably 20 mm or less, more preferably 10 mm or less, further preferably 5 mm or less, and particularly preferably 4 mm or less. If the width of the reaction layer is less than the lower limit, the reaction layer is divided so insufficiently that, for example, when the reaction layer comprises reaction layers of two or more types, the reaction of the materials constituting the reaction layers with each other occurs, or the thermal diffusion of one of the materials to the other occurs. For this reason, a performance of each reaction layer is likely to deteriorate, and the performance of the reaction layer tends to be insufficiently exhibited. Meanwhile, if the width exceeds the upper limit, a synergetic effect (coexistence effect) due to the reaction layers of two or more types tends to be insufficiently obtained, and a performance of the reaction layer tends to be insufficiently exhibited.

Moreover, when the reaction layer comprises reaction layers of two or more types, the lower limit of a pitch between adjacent reaction layers (a distance in the longitudinal direction of the cell between centers on surfaces of adjacent reaction layers) is preferably exceeding 0 mm, more preferably 0.5 mm or more, further preferably 1 mm or more, and particularly preferably 2 mm or more. The upper limit thereof is preferably 20 mm or less, more preferably 10 mm or less, further preferably 5 mm or less, and particularly preferably 4 mm or less. If the pitch between adjacent reaction layers is less than the lower limit, the reaction layer is divided so insufficiently that, for example, when the reaction layer comprises reaction layers of two or more types, the reaction of the materials constituting the reaction layers with each other occurs, or the thermal diffusion of one of the materials to the other occurs. For this reason, a performance of each reaction layer is likely to deteriorate, and the performance of the reaction layer tends to be insufficiently exhibited. Meanwhile, if the pitch exceeds the upper limit, a synergetic effect (coexistence effect) due to the reaction layers of two or more types tends to be insufficiently obtained, and a performance of the reaction layer tends to be insufficiently exhibited.

A thickness of the reaction layer is preferably 1 to 500 μm, and more preferably 5 to 100 μm. If the thickness of the reaction layer is less than the lower limit, the reaction layer cannot be formed in a sufficient amount. Thus, a performance of the reaction layer tends to be insufficiently exhibited. Meanwhile, if the thickness exceeds the upper limit, a flow path for fluid cannot be sufficiently obtained. Thus, the pressure drop of a fluid flowing through the cell increases, and, for example, in a case of a catalyst for purification of exhaust gas, the fuel-efficiency of the automobile tends to deteriorate.

(Structure of Honeycomb-Shaped Reaction Vessel)

The honeycomb-shaped reaction vessel of the present invention comprises:

the above-described honeycomb-shaped substrate; and the reaction layer arranged in at least a portion of an inner wall of a cell of the honeycomb-shaped substrate dividedly in a direction along an inner circumference of the cell and dividedly in a longitudinal direction of the cell. When the reaction layer is arranged in at least a portion of an inner wall of a cell of the honeycomb-shaped substrate dividedly in a direction along an inner circumference of the cell and dividedly in a longitudinal direction of the cell, the reaction layer is less likely to undergo deterioration in performance, even when exposed to high temperature for a long period. When the reaction layer comprises reaction layers of two or more types, each of the reaction layers may be entirely and/or partially in contact with or separated from an adjacent reaction layer.

From the viewpoints that a fluid such as a reaction substrate gas flows smoothly, so that generation of a turbulence flow is suppressed and the increase in pressure drop can be suppressed, and that the material can be applied continuously, so that the reaction layer can be formed easily, and the production costs can be reduced, the structure of the honeycomb-shaped reaction vessel is preferably such that the reaction layer is arranged helically in the longitudinal direction of the cell. Especially when the reaction layer comprises reaction layers of two or more types, the structure is preferably such that the reaction layers of two or more types are arranged multiple-helically (for example, double-helically in a case of reaction layers of two types, or triple-helically in a case of reaction layers of three types) in the longitudinal direction of the cell.

FIG. 1 is a perspective view schematically showing a preferred embodiment of a cell of such a honeycomb-shaped reaction vessel of the present invention. The cell 1a has a square cross-sectional shape, and reaction layers 101A and 101B of two types are arranged on an inner wall of the cell 1a double-helically in the longitudinal direction of the cell 1a.

(Method for Producing Honeycomb-Shaped Reaction Vessel)

Figure 2:
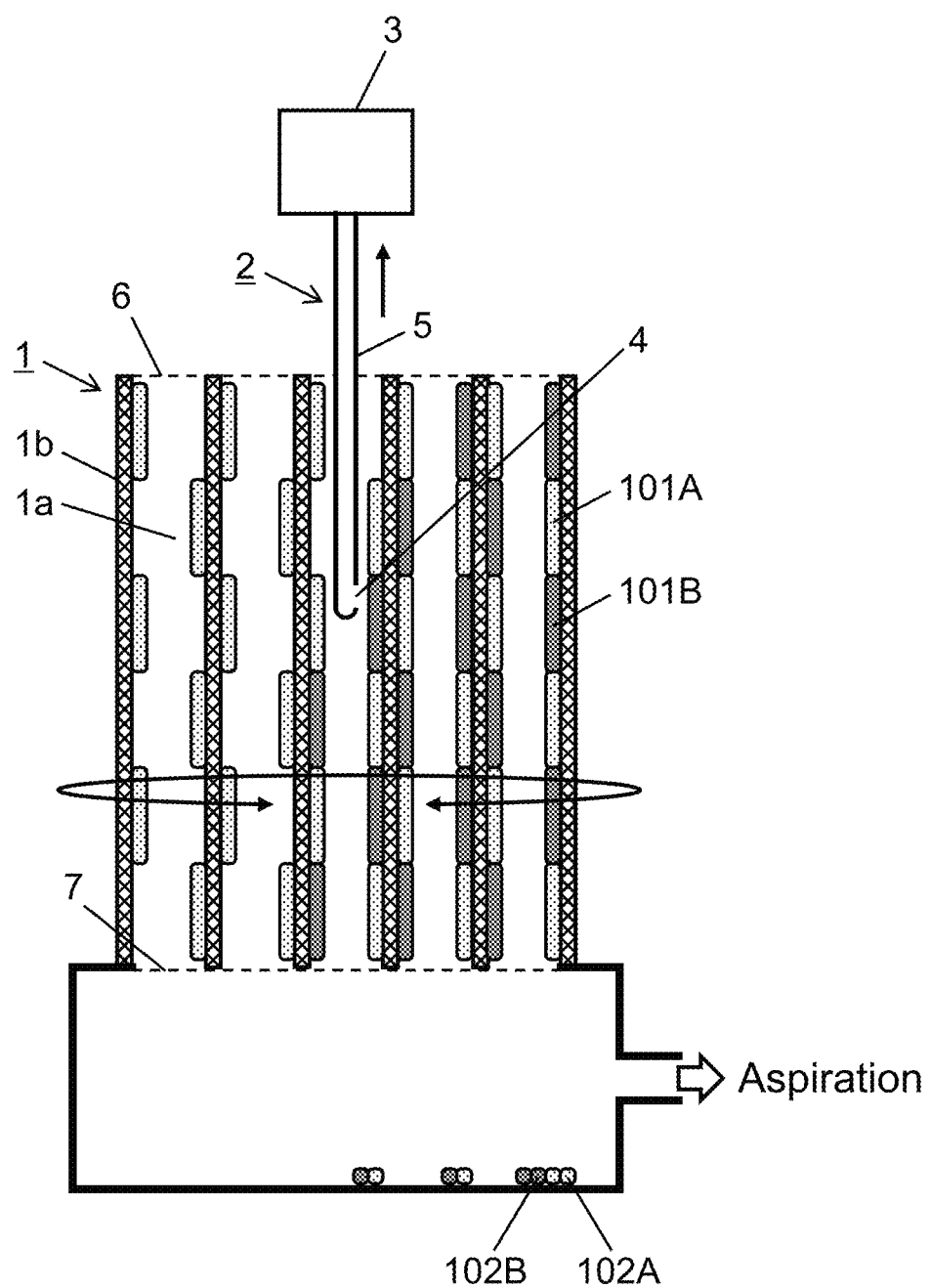
FIG. 2 is a schematic vertical cross-sectional view showing an example of an in-cell application device used to produce a honeycomb-shaped reaction vessel of the present invention.

Next, a method for producing a honeycomb-shaped reaction vessel of the present invention is described based on an example in which a reaction layer 101A made of a material A and a reaction layer 101B made of a material B as shown in FIG. 1 are formed. However, the method for producing a honeycomb-shaped reaction vessel of the present invention is not limited to this example. FIG. 2 is a schematic vertical cross-sectional view showing an example of an in-cell application device used to produce a honeycomb-shaped reaction vessel of the present invention.

The in-cell application device shown in FIG. 2 is for applying a material into each cell 1a of a honeycomb-shaped reaction vessel 1, and comprises: a discharge tube 2 insertable into the cell 1a; and a material supply device 3 for supplying the material to the discharge tube 2. In addition, the discharge tube 2 comprises: a material discharge outlet 4 formed in a side surface near a leading end of the discharge tube 2; and a material flow path 5 formed connectedly to the material discharge outlet 4. Moreover, the material supply device 3 is connected to the material flow path 5. This enables the material to be supplied from the material supply device 3 to the material flow path 5 and discharged through the material discharge outlet 4.

In the in-cell application device, the discharge tube 2 can be moved in the longitudinal direction of the cell 1a. This makes it possible to apply the material onto a partition wall 1b of the honeycomb-shaped reaction vessel 1 at a desired position thereof in the longitudinal direction. Moreover, in the in-cell application device, the discharge tube 2 is rotatable relatively about a rotation axis which is a center line in the longitudinal direction of the cell 1a of the honeycomb-shaped reaction vessel 1 into which the discharge tube 2 is to be inserted (i.e., with respect to a central axis of the longitudinal direction of the cell 1a). For example, the honeycomb-shaped reaction vessel 1 is rotatable about the rotation axis which is the center line in the longitudinal direction of the cell 1a into which the discharge tube 2 is to be inserted. This makes it possible to turn the material discharge outlet 4 toward a desired direction in the inner-circumferential direction of the partition wall 1b of the honeycomb-shaped reaction vessel 1 with the discharge tube 2 inserted in the cell 1*a*, making it possible to apply the material at a desired position in the inner-circumferential direction of the partition wall 1*b* of the honeycomb-shaped reaction vessel 1. Especially, the material is discharged, while the discharge tube 2 is being rotated relatively about the rotation axis which is the center line in the longitudinal direction of the cell 1*a* of the honeycomb-shaped reaction vessel 1 in which the discharge tube 2 has been inserted, and is being moved in the longitudinal direction of the cell 1*a*, preferably, while the honeycomb-shaped reaction vessel 1 is being rotated, and the discharge tube 2 is moved in the longitudinal direction of the cell 1*a* without rotating the discharge tube 2. In this manner, the material can be applied helically in the cell 1*a*, so that a reaction vessel can be produced in which the inner wall has a smooth flow path (cell) and in which the pressure drop is small.

Alternatively, in the in-cell application device, the discharge tube 2, instead of the honeycomb-shaped reaction vessel 1, may be rotatable about the rotation axis which is the center line in the longitudinal direction of the cell 1*a* in which the discharge tube 2 is to be inserted. This also makes it possible to rotate the discharge tube 2 relatively about the rotation axis which is the center line in the longitudinal direction of the cell 1*a* of the honeycomb-shaped reaction vessel 1 in which the discharge tube 2 has been inserted. This makes it possible to turn the material discharge outlet 4 toward a desired direction in the inner-circumferential direction of the partition wall 1*b* of the honeycomb-shaped reaction vessel 1 with the discharge tube 2 inserted in the cell 1*a*, making it possible to apply the material at a desired position in the inner-circumferential direction of the partition wall 1*b* of the honeycomb-shaped reaction vessel 1. Especially when the material is discharged, while the discharge tube 2 is being rotated and moved in the longitudinal direction of the cell 1*a* without rotating the honeycomb-shaped reaction vessel 1, the material can be applied helically in the cell 1*a*, so that a reaction vessel can be produced in which the inner wall has a smooth flow path (cell) and in which the pressure drop is small.

Moreover, in the in-cell application device, it is possible to move the discharge tube 2 freely in any direction on an end surface 6 of the honeycomb-shaped reaction vessel 1. This makes it possible to apply the material into any of the cells 1*a* of the honeycomb-shaped reaction vessel 1.

The in-cell application device may further comprise an aspiration device (not illustrated) for aspirating the inside of the cell 1*a* through an end surface 7 of the honeycomb-shaped reaction vessel 1. The aspiration of the inside of the cell 1*a* removes water contained in the applied material, making it possible to suppress penetration of water into the substrate. Moreover, the removal of the excessive material makes the inside of the cell flat and smooth, so that a reaction vessel can be produced in which the pressure drop is small and in which the inner wall has a smooth flow path (cell). Moreover, it is also possible to reduce change in water content in the reaction vessel due to water in the discharged material during the application, so that the sagging and cracking of the applied material can be optimized.

The material used to produce the honeycomb-shaped reaction vessel of the present invention by using the in-cell application device is not particularly limited, as long as the material can be applied into the cell of the honeycomb-shaped substrate by using the in-cell application device. The material may be in the form of liquid or slurry. However, it is necessary to adjust, as appropriate, the viscosity, particle size, and solid component ratio of the material, and the like to prevent clogging or sedimentation of the material (especially, a slurry material) in the material supply device, the material flow path, or the discharge outlet.

In the method for producing a honeycomb-shaped reaction vessel of the present invention using the in-cell application device, the discharge tube 2 is first inserted through the end surface 6 of the honeycomb-shaped reaction vessel 1, until the leading end of the discharge tube 2 reaches the end surface 7 of the honeycomb-shaped reaction vessel 1 (discharge tube insertion step). Next, the material A is supplied from the material supply device 3 to the material flow path 5 and discharged through the material discharge outlet 4. Thus, the material A is applied into the cell 1*a* of the honeycomb-shaped reaction vessel 1 to form the reaction layer 101A made of the material A on the partition wall 1*b* of the honeycomb-shaped reaction vessel 1 (application step). By controlling the movement of the honeycomb-shaped reaction vessel 1 and the discharge tube 2 here, the reaction layer 101A can be formed in the cell at a desired position in the longitudinal direction and the inner-circumferential direction.

For example, the material A is applied, while the discharge tube 2 is being rotated relatively about the rotation axis which is the center line in the longitudinal direction of the cell 1*a* of the honeycomb-shaped reaction vessel 1 in which the discharge tube 2 has been inserted, and moved in the longitudinal direction of the cell 1*a* from the end surface 7 to the end surface 6 of the honeycomb-shaped reaction vessel 1, preferably, while the honeycomb-shaped reaction vessel 1 is being rotated about the rotation axis which is the center line in the longitudinal direction of the cell 1*a* in which the discharge tube 2 has been inserted, and the discharge tube 2 is being moved in the longitudinal direction of the cell 1*a* from the end surface 7 to the end surface 6 of the honeycomb-shaped reaction vessel 1 without rotating the discharge tube 2. Thus, a reaction layer 101A made of a material A can be formed on the partition wall 1*b* of the honeycomb-shaped reaction vessel 1 helically in the longitudinal direction of the cell, so that a reaction vessel can be produced in which the inner wall has a smooth flow path (cell) and in which the pressure drop is small. In addition, when multiple materials are applied by repeating this operation, a honeycomb-shaped reaction vessel can be produced in which multiple reaction layers are arranged on the partition wall 1*b* of the honeycomb-shaped reaction vessel 1 multiple-helically in the longitudinal direction of the cell.

In addition, in the in-cell application device, the material A may be applied, while the discharge tube 2 is being rotated about the rotation axis which is the center line in the longitudinal direction of the cell 1*a* in which the discharge tube 2 has been inserted, without rotating the honeycomb-shaped reaction vessel 1, and moved in the longitudinal direction of the cell 1*a* from the end surface 7 to the end surface 6 of the honeycomb-shaped reaction vessel 1. This also enables the discharge tube 2 to be rotated relatively about the rotation axis which is the center line in the longitudinal direction of the cell 1*a* of the honeycomb-shaped reaction vessel 1 in which the discharge tube 2 has been inserted, and moved in the longitudinal direction of the cell 1*a* from the end surface 7 to the end surface 6 of the honeycomb-shaped reaction vessel 1. Thus, a reaction layer 101A made of a material A can be formed on the partition wall 1*b* of the honeycomb-shaped reaction vessel 1 helically in the longitudinal direction of the cell, so that a reaction vessel can be produced in which the inner wall has a smooth flow path (cell) and in which the pressure drop is small. In addition, when multiple materials are applied by repeating this operation, a reaction vessel can be produced in which multiple reaction layers are arranged on the partition wall 1b of the honeycomb-shaped reaction vessel 1 multiple-helically in the longitudinal direction of the cell.

In the above-described application step, the material may be supplied from the material supply device to the material flow path continuously at a constant flow rate, at a varying flow rate, or intermittently. By supplying the material continuously at a constant flow rate, a reaction layer having a uniform thickness can be formed. In addition, by adjusting, as appropriate, a flow rate of the material, or a movement rate in the longitudinal direction and a rotation rate of the discharge tube 2, a reaction layer having desired width and pitch can be formed. Alternatively, by supplying the material at a varying flow rate or intermittently, the reaction layer can have a thickness distribution. In a reaction vessel in which the reaction layer has a thickness distribution, a fluid such as a reaction substrate gas flows in the cell as a turbulent flow. Hence, the mixing efficiency of the fluid in the cell is improved.

Moreover, in the application step, the material is preferably applied, while the inside of the cell 1a is being aspirated through the end surface 7 of the honeycomb-shaped reaction vessel 1 by using the aspiration device. This removes water contained in the applied material, making it possible to suppress penetration of water into the substrate. Moreover, the removal of the excessive material makes the inner wall of the cell flat and smooth, so that a reaction vessel can be produced in which the pressure drop is small and in which the inner wall has a smooth flow path (cell).

Hereinabove, the method for producing a honeycomb-shaped reaction vessel of the present invention has been described; however, the method for producing a honeycomb-shaped reaction vessel of the present invention is not limited to the above-described embodiment. For example, the honeycomb-shaped reaction vessel of the present invention can also be produced by using an in-cell application device shown in FIG. 3.

Figure 3:
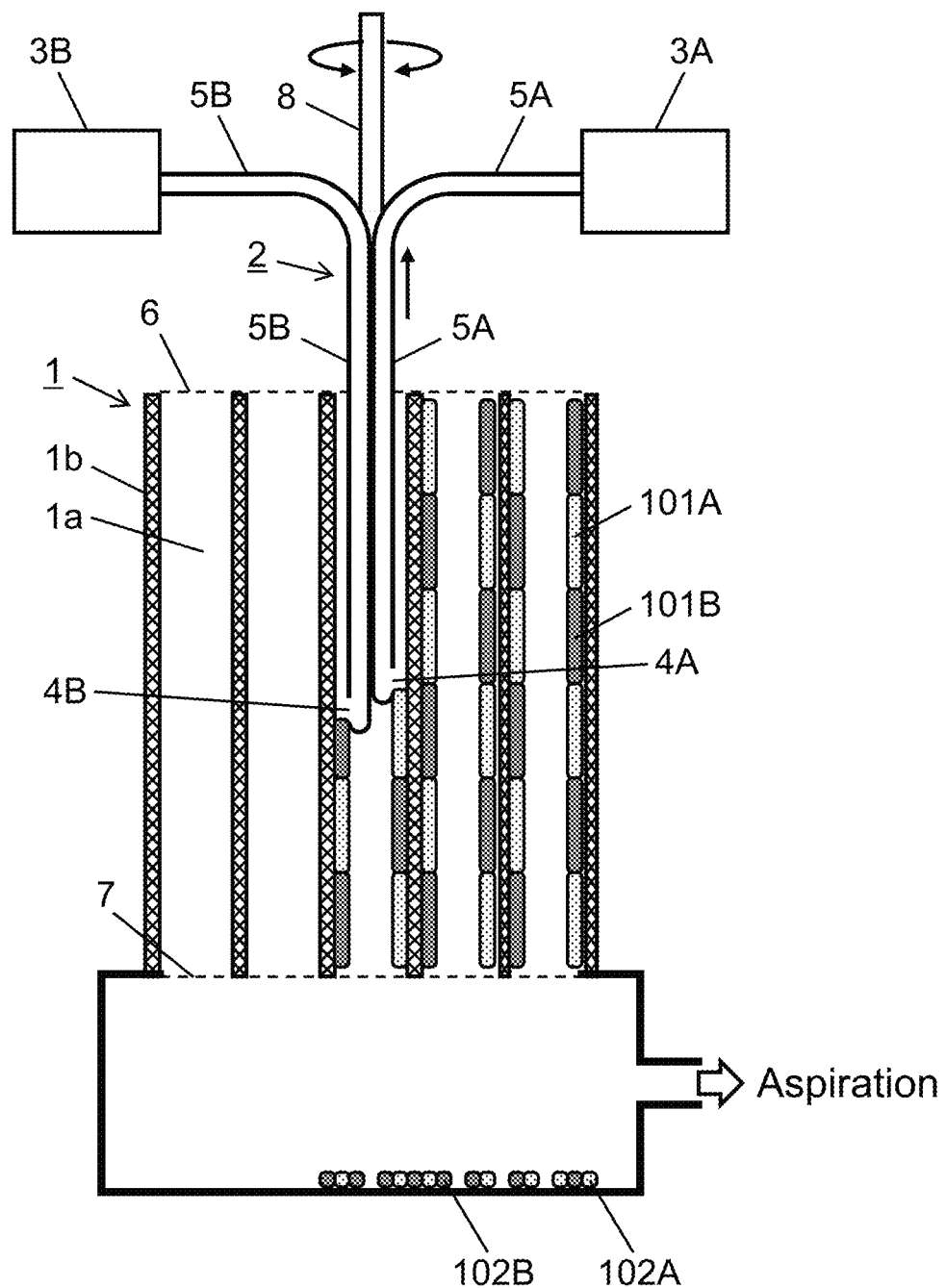
FIG. 3 is a schematic vertical cross-sectional view showing another example of an in-cell application device used to produce a honeycomb-shaped reaction vessel of the present invention.

The in-cell application device shown in FIG. 3 is for applying two materials A and B into each cell 1a of the honeycomb-shaped reaction vessel 1, and comprises: a discharge tube 2 insertable into the cell 1a; and a material supply device 3A and a material supply device 3B for supplying the material A and the material B each independently to a discharge tube 2. The discharge tube 2 comprises: a material discharge outlet 4A and a material discharge outlet 4B formed independent of each other; a material flow path 5A formed connectedly to the material discharge outlet 4A; and a material flow path 5B formed connectedly to the material discharge outlet 4B. Moreover, the material supply device 3A and the material supply device 3B are connected to the material flow path 5A and the material flow path 5B each independently. This makes it possible to supply the material A from the material supply device 3A to the material flow path 5A and the material B from the material supply device 3B to the material flow path 5B each independently, and discharge the material A through the material discharge outlet 4A and the material B through the material discharge outlet 4B each independently, so that the material A and the material B can be applied into the cell 1a of the honeycomb-shaped reaction vessel 1 in a state of not being mixed with each other but being separated from each other.

In the in-cell application device, it is also possible to use a discharge tube in which independent three or more material discharge outlets and three or more material flow paths connected to the material discharge outlets each independently are formed, and three or more material supply devices connected to the material flow paths each independently. This makes it possible to apply the three or more materials into each cell of a honeycomb-shaped reaction vessel in a state of not being mixed with each other but being separated from each other.

In the in-cell application device, the discharge tube 2 can be moved freely in any direction on the end surface 6 of the honeycomb-shaped reaction vessel 1. For this reason, it is possible to apply the material into any of the cells 1a of the honeycomb-shaped reaction vessel 1. In addition, the discharge tube 2 can be moved in the longitudinal direction and a lateral direction (or a radial direction) of the cell 1a. Moreover, it is also possible to rotate the discharge tube 2 relatively about the central axis in the longitudinal direction of each cell 1a of the honeycomb-shaped reaction vessel 1 (i.e., about a rotation axis which is the center in the longitudinal direction of the cell 1a). For example, the discharge tube 2 can be rotated relatively, for example, by rotating the discharge tube 2 (or rotating a rotation shaft 4 attached to the discharge tube 2) without rotating the honeycomb-shaped reaction vessel 1, or by rotating the honeycomb-shaped reaction vessel 1 without rotating the discharge tube 2. In the in-cell application device, the discharge tube can be moved freely in any direction in the cell and can be rotated relatively about the central axis of each cell in the longitudinal direction thereof. Thus, multiple materials can be applied at any positions in the cell in a state of being separated from each other. Especially when multiple materials are applied, while the discharge tube is moved in the longitudinal direction of the cell, a reaction vessel can be produced in which multiple reaction layers are distributed in the inner-circumferential direction of the cell. Meanwhile, when multiple materials are discharged, while the discharge tube is being rotated in a cell relatively about the central axis of the longitudinal direction of the cell and moved in the longitudinal direction of the cell, the multiple materials can be applied helically in the cell, so that a reaction vessel can be produced in which the inner wall has a smooth flow path (cell) and in which the pressure drop is small.

Moreover, the in-cell application device preferably further comprises an aspiration device (not illustrated) for aspirating the inside of the cell 1a through an end surface 7 of the honeycomb-shaped reaction vessel 1, which is on the side opposite to the end surface 6 located on the side where the discharge tube 2 is inserted. By aspirating the inside of the cell 1a, the excessive material is removed, and the inner wall of the cell is made flat and smooth, so that a reaction vessel can be produced in which the pressure drop is small and in which the inner wall has a smooth flow path (cell).

The materials used to produce the honeycomb-shaped reaction vessel of the present invention by using the in-cell application device are not particularly limited, as long as the materials can be applied into the cell of the honeycomb-shaped substrate by using the in-cell application device. The materials may be in the form of liquid or slurry. However, it is necessary to adjust, as appropriate, the viscosity, particle size, and solid component ratio of each material, and the like to prevent clogging or sedimentation of the material (especially, a slurry material) in the material supply device, the material flow path, and the material discharge outlet.

In the method for producing a honeycomb-shaped reaction vessel of the present invention using such an in-cell application device, the discharge tube 2 is first inserted through the end surface 6 of the honeycomb-shaped reaction vessel 1, until the leading end portion of the discharge tube 2 reaches the end surface 7 of the honeycomb-shaped reaction vessel 1 (discharge tube insertion step). Next, the material A and the material B are supplied from the material supply device 3A to the material flow path 5A and from the material supply device 3B to the material flow path 5B each independently, and the material A and the material B are discharged through the material discharge outlet 4A and through the material discharge outlet 4B each independently. Thus, the material A and the material B are applied into the cell 1a of the honeycomb-shaped reaction vessel 1 in a state of not being mixed with each other but being separated from each other to form a reaction layer 101A made of the material A and a reaction layer 101B made of the material B on the partition wall 1b of the honeycomb-shaped reaction vessel 1 in a state of being separated from each other (application step). By controlling the movement of the discharge tube 2 here, reaction layers having various structures can be formed.

For example, the material A and the material B are applied, while the discharge tube 2 is being rotated relatively about the central axis of the longitudinal direction of each cell 1a of the honeycomb-shaped reaction vessel 1 and moved in the longitudinal direction of the cell 1a from the end surface 7 to the end surface 6 of the honeycomb-shaped reaction vessel 1. Thus, a reaction layer 101A made of the material A and a reaction layer 101B made of the material B can be formed which are arranged double-helically on the partition wall 1b of the honeycomb-shaped reaction vessel 1.

In the application step, each of the materials may be supplied from the material supply device to the material flow path continuously at a constant flow rate, at a varying flow rate, or intermittently. By supplying each of the materials at a constant flow rate continuously, a reaction layer having a uniform thickness can be formed. In addition, by adjusting, as appropriate, a flow rate of each of the materials, or a movement rate in the longitudinal direction and a rotation rate of the discharge tube 2, a reaction layer having desired width and pitch can be formed. Alternatively, by supplying each of the materials at a varying flow rate or intermittently, the reaction layer can have a thickness distribution. In a reaction vessel in which the reaction layer has a thickness distribution, a fluid such as a reaction substrate gas flows in the cell as a turbulent flow. Hence, the mixing efficiency of the fluid in the cell is improved.

Moreover, in the application step, the material is preferably applied, while a gas such as air is supplied from a gas supply device to a gas flow path and blown through a gas discharge outlet. This makes it possible to surely attach the material tightly to the inner wall of the cell. This also removes the excessive material, making the inner wall of the cell flat and smooth, so that a reaction vessel can be produced in which the pressure drop is small and in which the inner wall has a smooth flow path (cell).

Moreover, in the application step, the material is preferably applied, while the inside of the cell 1a is being aspirated through the end surface 7 of the honeycomb-shaped reaction vessel 1 by using the aspiration device. This removes the excessive material, making the inner wall of the cell flat and smooth, so that a reaction vessel can be produced in which the pressure drop is small and in which the inner wall has a smooth flow path (cell).

EXAMPLES

Hereinafter, the present invention is described more specifically on the basis of Example and Comparative Examples; however, the present invention is not limited to Example below.

Preparation Example A1

The slurry material A used was a slurry material A1 prepared by mixing 1 part by mass of a ceria-zirconia solid solution powder (average particle diameter: 7.5 μm, maximum particle diameter determined by sifting: 25 μm) supporting 1% by mass of palladium as a solid component, 1 part by mass of a θ-alumina powder (average particle diameter: approximately 18 μm, maximum particle diameter determined by sifting: 35 μm, specific surface area: 100 m$^2$/g) containing 4% by mass of La in terms of $La_2O_3$, an acidic alumina sol (containing acetic acid) in an amount resulting in 10% by mass relative to all the solid components in the slurry material A1 to be obtained, acetic acid in an amount resulting in 3% by mass or less relative to all the solid components in the slurry material A1 to be obtained, and citric acid in an amount resulting in 3% by mass or less relative to all the solid components in the slurry material A1 to be obtained. The amount of the solid components contained in the slurry material A1 was 20 to 35% by mass. The slurry material A1 had a viscosity (25° C.) at a shear rate D=3.83 sec$^{-1}$ of 5000 to 3000 cP and a viscosity (25° C.) at a shear rate D=383 sec$^{-1}$ of 300 to 10 cP after 1 to 3 days from completion of the preparation.

Preparation Example B1

The slurry material B used was a slurry material B1 prepared by adding an acidic alumina sol (containing acetic acid) in an amount resulting in 10% by mass to a θ-alumina powder (average particle diameter: approximately 18 μm, maximum particle diameter determined by sifting: 35 μm, specific surface area: 100 m$^2$/g) supporting 0.15% by mass of rhodium as a solid component and containing 4% by mass of La in terms of $La_2O_3$, followed by mixing acetic acid in an amount resulting in 3% by mass or less relative to all the solid components in the slurry material B1 to be obtained and citric acid in an amount resulting in 3% by mass or less relative to all the solid components in the slurry material B1 to be obtained. The amount of the solid components in the slurry material B1 was 20 to 35% by mass. The slurry material B1 had a viscosity (25° C.) at a shear rate D=3.83 sec$^{-1}$ of 5000 to 3000 cP and a viscosity (25° C.) at a shear rate D=383 sec$^{-1}$ of 300 to 10 cP after 1 to 3 days from completion of the preparation.

Example 1

By using the in-cell application device shown in FIG. 2, a slurry material was applied into 36 cells in a center portion of a monolithically formed honeycomb-shaped reaction vessel (cross-section: 13.5 mm×13.5 mm □, length: 50 mm, cell shape: quadrangle cells, cell density: 250 cpi, cell thickness: 6 mil, number of cells in cross-section: 60 cells which were left after 4 cells at four corners were cut from 8×8 cells). The slurry material was not applied onto 24 cells in an outer peripheral portion of the monolithically formed honeycomb-shaped reaction vessel. As the discharge tube 2, a stainless steel pipe (outer diameter: 0.89 mm, inner diameter: 0.59 mm) was used in which a leading end is sealed in a semispherical shape, a material discharge outlet 4 having a diameter of 0.45 mm was formed in a side surface at a position 1 mm away from the leading end, and a side surface (entire periphery) in a range from the leading end to a position 9 mm away from the leading end was subjected to a Teflon (registered trademark)-coating treatment.

First, the discharge tube 2 of the in-cell application device shown in FIG. 2 was inserted through the end surface 6 of the honeycomb-shaped reaction vessel 1, until the leading end of the discharge tube 2 reached the end surface 7 of the honeycomb-shaped reaction vessel 1. Next, the slurry material A1 prepared in Preparation Example A1 was supplied as a slurry material A from the material supply device 3 to the material flow path 5 at a flow rate of 3.78 mg/second continuously for 10 seconds, and the slurry material A1 was discharged through the material discharge outlet 4, while the honeycomb-shaped reaction vessel 1 was being rotated at a rate of 3 revolutions per 10 seconds, and the discharge tube 2 was being moved at a rate of 5 mm/second in the longitudinal direction of the cell 1a from the end surface 7 to the end surface 6. After that, water in the applied slurry material A1 was removed by aspiration for 0.5 to 2 seconds. The series of operations were conducted on all the cells, followed by drying with air, and further calcination at 500° C. in the atmosphere. Thus, approximately 60 g of a reaction layer 101A (Pd layer) per liter of the apparent capacity of the honeycomb-shaped reaction vessel was formed on the partition wall 1b of the honeycomb-shaped reaction vessel 1 helically in the longitudinal direction of the cell 1a, wherein the reaction layer 101A rotated 3 revolutions between the end surface 7 and the end surface 6.

Next, the honeycomb-shaped reaction vessel 1 in which the helical reaction layer 101A had been formed was inverted upside down. Then, the discharge tube 2 was inserted through the surface serving as the end surface 6 after the inversion, until the leading end of the discharge tube 2 reached the end surface 7 of the honeycomb-shaped reaction vessel 1. After that, while the honeycomb-shaped reaction vessel 1 was being rotated at a rate of 3 revolutions per 10 seconds, and the discharge tube 2 was being moved at a rate of 5 mm/second in the longitudinal direction of the cell 1a from the end surface 7 toward the end surface 6, the slurry material B1 prepared in Preparation Example B1 was supplied as a slurry material B from the material supply device 3 to the material flow path 5 at a flow rate of 3.78 mg/second continuously for 10 seconds, and the slurry material B1 was discharged through the material discharge outlet 4 such that the slurry material B1 was applied at a position face-to-face with the helical reaction layer 101A. After that, water in the applied slurry material B1 was removed by aspiration for 0.5 to 2 seconds. The series of operations were conducted on all the cells, followed by drying with air, and further calcination at 500° C. in the atmosphere. Thus, approximately 60 g of a reaction layer 101B (Rh layer) per liter of the apparent capacity of the honeycomb-shaped reaction vessel was formed at the position face-to-face with the reaction layer 101A on the partition wall 1b of the honeycomb-shaped reaction vessel 1 helically in the longitudinal direction of the cell 1a, wherein the reaction layer 101B rotated 3 revolutions between the end surface 7 and the end surface 6.

The 24 cells in the outer peripheral portion and the 4 cells at the four corners inside the outer peripheral portion were cut from the honeycomb-shaped reaction vessel 1 in which the reaction layer 101A (Pd layer) and the reaction layer 101B (Rh layer) were formed as described above. Thus, a honeycomb-shaped reaction vessel having an apparent capacity of approximately 5 ml was obtained in which the reaction layer 101A (Pd layer) and the reaction layer 101B (Rh layer) were arranged on the inner wall of each of the 32 cells 1a double-helically in the longitudinal direction of the cell 1a and each rotated 3 revolutions between the end surface 7 and the end surface 6, as shown in FIG. 1.

Comparative Example 1

First, the slurry material A1 (Pd-containing slurry material) prepared in Preparation Example A1 was discharged onto a partition wall 1b of a honeycomb-shaped reaction vessel 1 in the same manner as in Example 1 to form a coat layer A of the slurry material A1 helically in the longitudinal direction of the cell 1a. Immediately thereafter, another discharge tube was inserted through the end surface 6 of the honeycomb-shaped reaction vessel 1 in which the helical coat layer A had been formed, until the discharge tube reached the end surface 7 of the honeycomb-shaped reaction vessel 1. While being rotated in each of the cells, the discharge tube was moved up and down between the end surface 6 and the end surface 7. Thus, a Pd-containing single-layered entire-periphery coat layer was formed on the partition wall 1b of the honeycomb-shaped reaction vessel 1. After that, aspiration, air drying, and calcination were conducted in the same manner as in Example 1. Thus, approximately 60 g of a reaction layer 101A (Pd layer) per liter of the apparent capacity of the honeycomb-shaped reaction vessel was formed on the entire surface of the partition wall 1b of the honeycomb-shaped reaction vessel 1.

Next, the slurry material B1 (Rh-containing slurry material) prepared in Preparation Example B1 was discharged onto the reaction layer 101A of the honeycomb-shaped reaction vessel 1 in the same manner as in Example 1 to form a coat layer B of the slurry material B1 helically in the longitudinal direction of the cell 1a. Immediately thereafter, another discharge tube was inserted through the end surface 6 of the honeycomb-shaped reaction vessel 1 in which the helical coat layer B has been formed, until the discharge tube reached the end surface 7 of the honeycomb-shaped reaction vessel 1. While being rotated in each of the cells, the other discharge tube was moved up and down between the end surface 6 and the end surface 7. Thus, a Rh-containing single-layered entire-periphery coat layer was formed on the entire surface of the reaction layer 101A (Pd layer). After that, aspiration, air drying, and calcination were conducted in the same manner as in Example 1. Thus, approximately 60 g of a reaction layer 101B (Rh layer) per liter of the apparent capacity of the honeycomb-shaped reaction vessel was formed on the entire surface of the reaction layer 101A (Pd layer).

Figure 4:
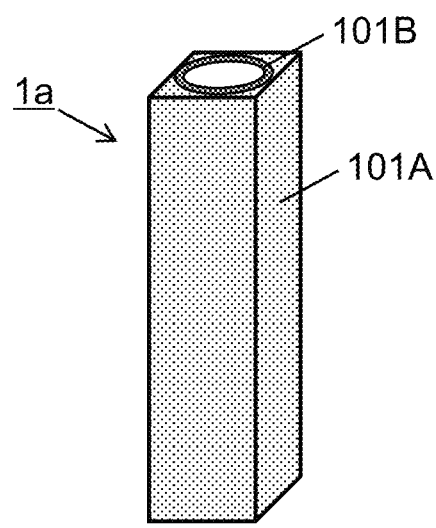
FIG. 4 is a perspective view schematically showing a cell of a honeycomb-shaped reaction vessel obtained in Comparative Example 1.

The 24 cells in the outer peripheral portion and the 4 cells at the four corners inside the outer peripheral portion were cut from the honeycomb-shaped reaction vessel 1 in which the reaction layer 101A (Pd layer) and the reaction layer 101B (Rh layer) were formed as described above. Thus, a honeycomb-shaped reaction vessel having an apparent capacity of approximately 5 ml was obtained in which the reaction layer 101A (Pd layer) and the reaction layer 101B (Rh layer) were laminated sequentially on the entire surface of the inner wall of each of the 32 cells 1a as shown in FIG. 4.

Comparative Example 2

First, in the same manner as in Example 1, except that the slurry material A1 prepared in Preparation Example A1 was discharged through the material discharge outlet 4 without rotating the discharge tube 2 and the honeycomb-shaped reaction vessel 1, approximately 60 g of a reaction layer 101A (Pd layer) per liter of the apparent capacity of the honeycomb-shaped reaction vessel was formed on the partition wall 1b of the honeycomb-shaped reaction vessel 1 in a portion in the inner-circumferential direction of the cell 1a linearly in the longitudinal direction of the cell 1a.

Next, in the same manner as in Example 1, except that the honeycomb-shaped reaction vessel 1 in which the linear reaction layer 101A had been formed was inverted upside down, and then the slurry material B1 prepared in Preparation Example B1 was discharged through the material discharge outlet 4 without rotating the discharge tube 2 and the honeycomb-shaped reaction vessel 1 such that the slurry material B1 was applied at a position face-to-face with the linear reaction layer 101A, approximately 60 g of a reaction layer 101B (Rh layer) per liter of the apparent capacity of the honeycomb-shaped reaction vessel was formed on the partition wall 1b of the honeycomb-shaped reaction vessel 1 at the position face-to-face with the reaction layer 101A linearly in the longitudinal direction of the cell 1a.

Figure 5:
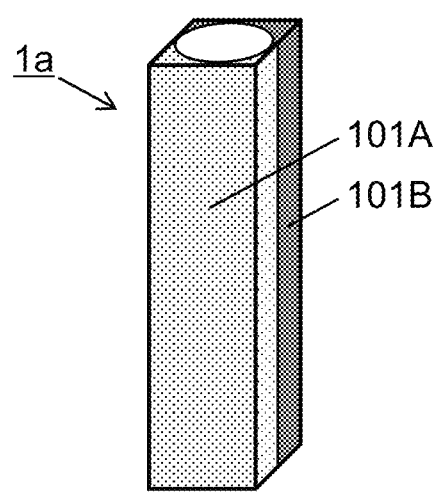
FIG. 5 is a perspective view schematically showing a cell of a honeycomb-shaped reaction vessel obtained in Comparative Example 2.

The 24 cells in the outer peripheral portion and the 4 cells at the four corners inside the outer peripheral portion were cut from the honeycomb-shaped reaction vessel 1 in which the reaction layer 101A (Pd layer) and the reaction layer 101B (Rh layer) were formed as described above. Thus, a honeycomb-shaped reaction vessel having an apparent capacity of approximately 5 ml was obtained in which the reaction layer 101A (Pd layer) and the reaction layer 101B (Rh layer) were arranged on the inner wall of each of the 32 cells 1a dividedly from each other in the inner-circumferential direction of the cell 1a and were each arranged linearly in the longitudinal direction of the cell 1a, as shown in FIG. 5.

<Durability Test>

The honeycomb-shaped reaction vessels obtained in Example 1 and Comparative Examples 1 and 2 were each placed in an electric furnace, and a durability test was conducted at 1050° C. for 5 hours, and further for 15 hours (total time of durability test: 20 hours), while a rich atmospheric gas [$H_2$ (2%)+$CO_2$ (10%)+$H_2O$ (3%, humidification by bubbling)+$N_2$ (the balance)] (5 minutes) and a lean atmospheric gas [$O_2$ (1%)+$CO_2$ (10%)+$H_2O$ (3%, humidification by bubbling)+$N_2$ (the balance)] (5 minutes) are being alternately allowed to flow at a gas flow rate of 500 ml/min per catalyst.

<Measurement of 50% NO Removal Temperature during Temperature Rise>

Figure 6:
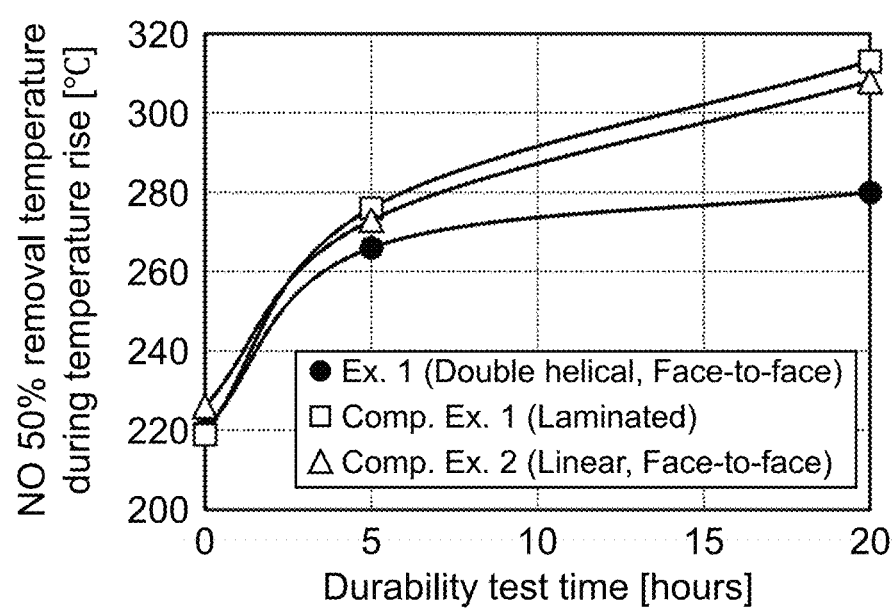
FIG. 6 is a graph showing a relationship between a durability test time and a 50% NO removal temperature during temperature rise.

While a rich steady-state gas [NO (0.1%)+CO (0.5%)+$H_2O$ (3%)+$O_2$+$N_2$ (the balance)] was being allowed to flow at a gas flow rate of 15 L/min (SV: 180,000 $h^{-1}$) in the honeycomb-shaped reaction vessel before the durability test, after the 5-hour durability test, and after the additional 15-hour durability test (i.e., after the 20-hour durability test), the temperature was lowered from 500° C. to 150° C., and then raised from 150° C. to 600° C. at 24° C./min. Note that the $O_2$ concentration in the rich steady-state gas was adjusted by adding oxygen gas under a feedback control such that an $O_2$ sensor placed at an inlet of the reaction vessel indicated a λ of 0.992. The 50% NO removal temperature was measured during the temperature rise. Table 1 and FIG. 6 show the results.

<Measurement of NO Removal Ratio Under Rich-Gas Steady State>

A rich gas [CO (0.65%)+NO (0.15%)+$H_2O$ (3%)+$N_2$ (the balance)] (3 minutes) and a lean gas [$O_2$ (0.65%)+CO (0.65%)+NO (0.15%)+$H_2O$ (3%)+$N_2$ (the balance)] (3 minutes) were allowed to flow in an alternately switched manner in 6-minute cycles at a temperature of 500° C. and at a gas flow rate of 15 L/min in the honeycomb-shaped reaction vessel before the durability test, after the 5-hour durability test, and after the additional 15-hour durability test (i.e., after the 20-hour durability test). After the changes in the temperature and gas concentrations were found to be stabilized, the average NO concentrations at an inlet and an outlet of the reaction vessel were measured for 100 seconds immediately before the flowing gas was switched from the rich gas to the lean gas. Then, the average NO removal ratio was calculated, and this was employed as the NO removal ratio under the rich-gas steady state. Table 1 and FIG. 7 show the results.

TABLE 1

| Shape and arrangement of reaction layer | 50% NO removal temperature during temperature rise [° C.] Durability test time [hours] | | | NO removal ratio under rich-gas steady state [%] Durability test time [hours] | | |
|---|---|---|---|---|---|---|
| | 0 | 5 | 20 | 0 | 5 | 20 |
| Example 1 Double helical and face-to-face | 220 | 266 | 280 | 98 | 95 | 91 |
| Comp. Ex. 1 Laminated | 219 | 276 | 313 | 94 | 93 | 87 |
| Comp. Ex. 2 Linear and face-to-face | 226 | 273 | 308 | 98 | 94 | 84 |

Figure 7:
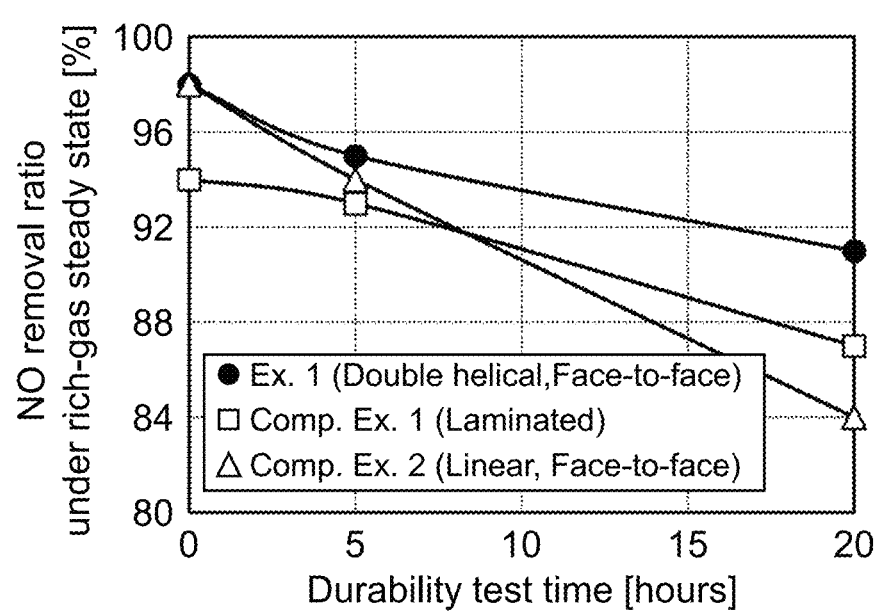
FIG. 7 is a graph showing a relationship between a durability test time and a NO removal ratio under a rich-gas steady state.

As shown in Table 1 and FIG. 6 and FIG. 7, it was found that the honeycomb-shaped reaction vessel (Comparative Example 1) in which the reaction layers of two types were laminated and the honeycomb-shaped reaction vessel (Comparative Example 2) in which the reaction layers of two types were arranged linearly face-to-face with each other underwent great elevation in the 50% NO removal temperature during the temperature rise and great lowering of the NO removal ratio under the rich-gas steady state with the increase in durability test time, indicating that the NO removal performance was greatly lowered. On the other hand, it was found that the honeycomb-shaped reaction vessel obtained in Example 1 underwent a smaller elevation in the 50% NO removal temperature during the temperature rise due to the durability test, and a smaller decrease in the NO removal ratio under the rich-gas steady state due to the durability test than the honeycomb-shaped reaction vessels obtained in Comparative Examples 1 and 2. From these results, it was found that the decrease in NO removal performance due to the durability test was suppressed by arranging the reaction layers of two types face-to-face and double-helically in the longitudinal direction of the cells of the honeycomb-shaped reaction vessel.

Preparation Example A2

The slurry material A used was a slurry material A2 obtained by preparing a slurry of a mixed powder of a ceria-zirconia solid solution (CZ) powder, a barium sulfate ($BaSO_4$) powder, an alumina-ceria-zirconia composite oxide (ACZ) powder, an alumina powder (specific surface area: 100 $m^2$/g), and an alumina sol binder, wherein palladium (Pd) was supported on the mixed powder, and then passing the slurry through a sieve having a mesh size of 250 μm. The amount of the solid components contained in the slurry material A2 was 28% by mass. The amounts of Pd, CZ, $BaSO_4$, ACZ, alumina, and the alumina sol binder in the slurry material A2 were each adjusted such that the amounts per liter of the apparent capacity of the honeycomb-shaped reaction vessel were Pd: 0.3 g/L, CZ: 5.5 g/L, $BaSO_4$: 3 g/L, ACZ: 26.5 g/L, alumina: 23 g/L, and the alumina sol binder: 1.7 g/L in the reaction layer (Pd layer) formed.

Preparation Example B2

The slurry material B used was a slurry material B2 prepared by mixing to a lanthanum-stabilized activated alumina (LSA) powder (maximum particle diameter determined by sifting: 32 µm, specific surface area: 100 m²/g) supporting rhodium and an alumina sol binder, and then passing the resultant through a sieve having a mesh size of 250 µm. The amount of the solid components in the slurry material B2 was 21.8% by mass. The amounts of Rh, LSA, and the alumina sol binder in the slurry material B2 were each adjusted such that the amounts per liter of the apparent capacity of the honeycomb-shaped reaction vessel were Rh: 0.15 g/L, LSA: 54 g/L, and the alumina sol binder: 5.4 g/L in the reaction layer (Rh layer) formed.

Example 2-1

In the in-cell application device shown in FIG. 2, the honeycomb-shaped reaction vessel 1 used was a monolithically formed honeycomb-shaped reaction vessel (cross-section: 13.4 mm×13.4 mm □, length: 50 mm, cell shape: quadrangle cells, cell density: 250 cpi, cell thickness: 6 mil, number of cells in cross-section: 60 cells which were left after 4 cells at four corners were cut from 8×8 cells). A slurry material was applied into 36 cells in a center portion of the monolithically formed honeycomb-shaped reaction vessel. The slurry material was not applied onto 24 cells in an outer peripheral portion of the monolithically formed honeycomb-shaped reaction vessel. As the discharge tube 2, a stainless steel pipe (outer diameter: 0.89 mm, inner diameter: 0.59 mm) was used in which a leading end is sealed in a semispherical shape, a material discharge outlet 4 having a diameter of 0.45 mm was formed in a side surface at a position 1 mm away from the leading end, and a side surface (entire periphery) in a range from the leading end to a position 9 mm away from the leading end was subjected to a Teflon (registered trademark)-coating treatment.

Widths of a reaction layer 101A (Pd layer) and a reaction layer 101B (Rh layer) were both set to 12.5 mm, and a pitch between the reaction layer 101A (Pd layer) and a reaction layer 101B (Rh layer) which were adjacent was set to 12.5 mm. First, in the same manner as in Example 1 (the movement rate of the discharge tube 2: 5 mm/second, the flow rate of the slurry material A: 3.78 mg/second) except that the slurry material A2 prepared in Preparation Example A2 was used as a slurry material A, and the rotation rate of the honeycomb-shaped reaction vessel 1 was changed to 2 revolutions per 10 seconds, approximately 60 g of a reaction layer 101A (Pd layer) per liter of the apparent capacity of the honeycomb-shaped reaction vessel was formed on the partition wall 1b of the honeycomb-shaped reaction vessel 1 helically in the longitudinal direction of the cell 1a, wherein the reaction layer 101A rotated 2 revolutions between the end surface 7 and the end surface 6.

Next, in the same manner as in Example 1 (the movement rate of the discharge tube 2: 5 mm/second, the flow rate of the slurry material B: 3.78 mg/second) except that the slurry material B2 prepared in Preparation Example B2 was used as a slurry material B, and the rotation rate of the honeycomb-shaped reaction vessel 1 was changed to 2 revolutions per 10 seconds, approximately 60 g of a reaction layer 101B (Rh layer) per liter of the apparent capacity of the honeycomb-shaped reaction vessel was formed at the position face-to-face with the reaction layer 101A on the partition wall 1b of the honeycomb-shaped reaction vessel 1 helically in the longitudinal direction of the cell 1a, wherein the reaction layer 101B rotated 2 revolutions between the end surface 7 and the end surface 6.

The reaction layer 101A (Pd layer) and the reaction layer 101B (Rh layer) formed as described above were observed by using X-ray Computed Tomography (CT). The width of the reaction layer (the length in the longitudinal direction of the cell on a surface of the reaction layer) was both approximate 12 mm, and the pitch between adjacent reaction layers (the distance in the longitudinal direction of the cell between centers on surfaces of adjacent reaction layers) was both approximate 12 mm.

Example 2-2

Widths of a reaction layer 101A (Pd layer) and a reaction layer 101B (Rh layer) were both set to 8.33 mm, and a pitch between the reaction layer 101A (Pd layer) and a reaction layer 101B (Rh layer) which were adjacent was set to 8.33 mm. First, in the same manner as in Example 2-1 (the movement rate of the discharge tube 2: 5 mm/second, the flow rate of the slurry material A: 3.78 mg/second) except that the rotation rate of the honeycomb-shaped reaction vessel 1 was changed to 3 revolutions per 10 seconds, approximately 60 g of a reaction layer 101A (Pd layer) per liter of the apparent capacity of the honeycomb-shaped reaction vessel was formed on the partition wall 1b of the honeycomb-shaped reaction vessel 1 helically in the longitudinal direction of the cell 1a, wherein the reaction layer 101A rotated 3 revolutions between the end surface 7 and the end surface 6.

Next, in the same manner as in Example 2-1 (the movement rate of the discharge tube 2: 5 mm/second, the flow rate of the slurry material B: 3.78 mg/second) except that the rotation rate of the honeycomb-shaped reaction vessel 1 was changed to 3 revolutions per 10 seconds, approximately 60 g of a reaction layer 101B (Rh layer) per liter of the apparent capacity of the honeycomb-shaped reaction vessel was formed at the position face-to-face with the reaction layer 101A on the partition wall 1b of the honeycomb-shaped reaction vessel 1 helically in the longitudinal direction of the cell 1a, wherein the reaction layer 101B rotated 3 revolutions between the end surface 7 and the end surface 6.

The reaction layer 101A (Pd layer) and the reaction layer 101B (Rh layer) formed as described above were observed by using X-ray Computed Tomography (CT). The width of the reaction layer (the length in the longitudinal direction of the cell on a surface of the reaction layer) was both approximate 8 mm, and the pitch between adjacent reaction layers (the distance in the longitudinal direction of the cell between centers on surfaces of adjacent reaction layers) was both approximate 8 mm.

Example 2-3

Widths of a reaction layer 101A (Pd layer) and a reaction layer 101B (Rh layer) were both set to 6.25 mm, and a pitch between the reaction layer 101A (Pd layer) and a reaction layer 101B (Rh layer) which were adjacent was set to 6.25 mm. First, in the same manner as in Example 2-1 (the flow rate of the slurry material A: 3.78 mg/second) except that the rotation rate of the honeycomb-shaped reaction vessel 1 was changed to 2 revolutions per 10 seconds and the movement rate of the discharge tube 2 was changed to 2.5 mm/second, approximately 60 g of a reaction layer 101A (Pd layer) per liter of the apparent capacity of the honeycomb-shaped reaction vessel was formed on the partition wall 1b of the honeycomb-shaped reaction vessel 1 helically in the longitudinal direction of the cell 1*a*, wherein the reaction layer 101A rotated 4 revolutions between the end surface 7 and the end surface 6.

Next, in the same manner as in Example 2-1 (the flow rate of the slurry material B: 3.78 mg/second) except that the rotation rate of the honeycomb-shaped reaction vessel 1 was changed to 2 revolutions per 10 seconds and the movement rate of the discharge tube 2 was changed to 2.5 mm/second, approximately 60 g of a reaction layer 101B (Rh layer) per liter of the apparent capacity of the honeycomb-shaped reaction vessel was formed at the position face-to-face with the reaction layer 101A on the partition wall 1*b* of the honeycomb-shaped reaction vessel 1 helically in the longitudinal direction of the cell 1*a*, wherein the reaction layer 101B rotated 4 revolutions between the end surface 7 and the end surface 6.

The reaction layer 101A (Pd layer) and the reaction layer 101B (Rh layer) formed as described above were observed by using X-ray Computed Tomography (CT). The width of the reaction layer (the length in the longitudinal direction of the cell on a surface of the reaction layer) was both approximate 6 mm, and the pitch between adjacent reaction layers (the distance in the longitudinal direction of the cell between centers on surfaces of adjacent reaction layers) was both approximate 6 mm.

Example 2-4

Widths of a reaction layer 101A (Pd layer) and a reaction layer 101B (Rh layer) were both set to 4.17 mm, and a pitch between the reaction layer 101A (Pd layer) and a reaction layer 101B (Rh layer) which were adjacent was set to 4.17 mm. First, in the same manner as in Example 2-1 (the flow rate of the slurry material A: 3.78 mg/second) except that the rotation rate of the honeycomb-shaped reaction vessel 1 was changed to 3 revolutions per 10 seconds and the movement rate of the discharge tube 2 was changed to 2.5 mm/second, approximately 60 g of a reaction layer 101A (Pd layer) per liter of the apparent capacity of the honeycomb-shaped reaction vessel was formed on the partition wall 1*b* of the honeycomb-shaped reaction vessel 1 helically in the longitudinal direction of the cell 1*a*, wherein the reaction layer 101A rotated 6 revolutions between the end surface 7 and the end surface 6.

Next, in the same manner as in Example 2-1 (the flow rate of the slurry material B: 3.78 mg/second) except that the rotation rate of the honeycomb-shaped reaction vessel 1 was changed to 3 revolutions per 10 seconds and the movement rate of the discharge tube 2 was changed to 2.5 mm/second, approximately 60 g of a reaction layer 101B (Rh layer) per liter of the apparent capacity of the honeycomb-shaped reaction vessel was formed at the position face-to-face with the reaction layer 101A on the partition wall 1*b* of the honeycomb-shaped reaction vessel 1 helically in the longitudinal direction of the cell 1*a*, wherein the reaction layer 101B rotated 6 revolutions between the end surface 7 and the end surface 6.

The reaction layer 101A (Pd layer) and the reaction layer 101B (Rh layer) formed as described above were observed by using X-ray Computed Tomography (CT). The width of the reaction layer (the length in the longitudinal direction of the cell on a surface of the reaction layer) was both approximate 4 mm, and the pitch between adjacent reaction layers (the distance in the longitudinal direction of the cell between centers on surfaces of adjacent reaction layers) was both approximate 4 mm.

Example 2-5

Widths of a reaction layer 101A (Pd layer) and a reaction layer 101B (Rh layer) were both set to 3.13 mm, and a pitch between the reaction layer 101A (Pd layer) and a reaction layer 101B (Rh layer) which were adjacent was set to 3.13 mm. First, in the same manner as in Example 2-1 (the flow rate of the slurry material A: 3.78 mg/second) except that the rotation rate of the honeycomb-shaped reaction vessel 1 was changed to 2 revolutions per 10 seconds and the movement rate of the discharge tube 2 was changed to 1.25 mm/second, approximately 60 g of a reaction layer 101A (Pd layer) per liter of the apparent capacity of the honeycomb-shaped reaction vessel was formed on the partition wall 1*b* of the honeycomb-shaped reaction vessel 1 helically in the longitudinal direction of the cell 1*a*, wherein the reaction layer 101A rotated 8 revolutions between the end surface 7 and the end surface 6.

Next, in the same manner as in Example 2-1 (the flow rate of the slurry material B: 3.78 mg/second) except that the rotation rate of the honeycomb-shaped reaction vessel 1 was changed to 2 revolutions per 10 seconds and the movement rate of the discharge tube 2 was changed to 1.25 mm/second, approximately 60 g of a reaction layer 101B (Rh layer) per liter of the apparent capacity of the honeycomb-shaped reaction vessel was formed at the position face-to-face with the reaction layer 101A on the partition wall 1*b* of the honeycomb-shaped reaction vessel 1 helically in the longitudinal direction of the cell 1*a*, wherein the reaction layer 101B rotated 8 revolutions between the end surface 7 and the end surface 6.

The reaction layer 101A (Pd layer) and the reaction layer 101B (Rh layer) formed as described above were observed by using X-ray Computed Tomography (CT). The width of the reaction layer (the length in the longitudinal direction of the cell on a surface of the reaction layer) was both approximate 3 mm, and the pitch between adjacent reaction layers (the distance in the longitudinal direction of the cell between centers on surfaces of adjacent reaction layers) was both approximate 3 mm.

Example 2-6

Widths of a reaction layer 101A (Pd layer) and a reaction layer 101B (Rh layer) were both set to 2.08 mm, and a pitch between the reaction layer 101A (Pd layer) and a reaction layer 101B (Rh layer) which were adjacent was set to 2.08 mm. First, in the same manner as in Example 2-1 (the flow rate of the slurry material A: 3.78 mg/second) except that the rotation rate of the honeycomb-shaped reaction vessel 1 was changed to 3 revolutions per 10 seconds and the movement rate of the discharge tube 2 was changed to 1.25 mm/second, approximately 60 g of a reaction layer 101A (Pd layer) per liter of the apparent capacity of the honeycomb-shaped reaction vessel was formed on the partition wall 1*b* of the honeycomb-shaped reaction vessel 1 helically in the longitudinal direction of the cell 1*a*, wherein the reaction layer 101A rotated 12 revolutions between the end surface 7 and the end surface 6.

Next, in the same manner as in Example 2-1 (the flow rate of the slurry material B: 3.78 mg/second) except that the rotation rate of the honeycomb-shaped reaction vessel 1 was changed to 3 revolutions per 10 seconds and the movement rate of the discharge tube 2 was changed to 1.25 mm/second, approximately 60 g of a reaction layer 101B (Rh layer) per liter of the apparent capacity of the honeycomb-shaped reaction vessel was formed at the position face-to-face with the reaction layer 101A on the partition wall 1b of the honeycomb-shaped reaction vessel 1 helically in the longitudinal direction of the cell 1a, wherein the reaction layer 101B rotated 12 revolutions between the end surface 7 and the end surface 6.

The reaction layer 101A (Pd layer) and the reaction layer 101B (Rh layer) formed as described above were observed by using X-ray Computed Tomography (CT). The width of the reaction layer (the length in the longitudinal direction of the cell on a surface of the reaction layer) was both approximate 2 mm, and the pitch between adjacent reaction layers (the distance in the longitudinal direction of the cell between centers on surfaces of adjacent reaction layers) was both approximate 2 mm.

Examples 3-1 to 3-6

In the same manner as in Examples 2-1 to 2-6 except that in the in-cell application device shown in FIG. 2, the honeycomb-shaped reaction vessel 1 used was a monolithically formed honeycomb-shaped reaction vessel (cross-section: 10.0 mm×10.0 mm □, length: 50 mm, cell shape: quadrangle cells, cell density: 250 cpi, cell thickness: 6 mil, number of cells in cross-section: 60 cells which were left after 4 cells at four corners were cut from 8×8 cells), double-helical reaction layers (a reaction layer 101A (Pd layer) and a reaction layer 101B (Rh layer)) were formed on an inner wall of each of 36 cells in a center portion of the honeycomb-shaped reaction vessel in the longitudinal direction of the cell 1a, wherein the reaction layers rotated 2 revolutions (Example 3-1), 3 revolutions (Example 3-2), 4 revolutions (Example 3-3), 6 revolutions (Example 3-4), 8 revolutions (Example 3-5), 12 revolutions (Example 3-6) between the end surface 7 and the end surface 6, such that amount of each of the reaction layers coated was approximately 60 g per liter of the apparent capacity of the honeycomb-shaped reaction vessel. The reaction layers were not formed on inner walls of 24 cells in an outer peripheral portion of the honeycomb-shaped reaction vessel.

The 24 cells in the outer peripheral portion and the 4 cells at the four corners inside the outer peripheral portion were cut from the honeycomb-shaped reaction vessel 1 in which the reaction layer 101A (Pd layer) and the reaction layer 101B (Rh layer) were formed as described above. Thus, honeycomb-shaped reaction vessels were obtained in which the reaction layer 101A (Pd layer) and the reaction layer 101B (Rh layer) were arranged on the inner wall of each of the 32 cells 1a double-helically in the longitudinal direction of the cell 1a and each rotated 2 to 12 revolutions between the end surface 7 and the end surface 6.

Comparative Example 3

In the same manner as in Comparative Example 1 except that in the in-cell application device shown in FIG. 2, the honeycomb-shaped reaction vessel 1 used was a monolithically formed honeycomb-shaped reaction vessel (cross-section: 10.0 mm×10.0 mm □, length: 50 mm, cell shape: quadrangle cells, cell density: 250 cpi, cell thickness: 6 mil, number of cells in cross-section: 60 cells which were left after 4 cells at four corners were cut from 8×8 cells), the slurry material A2 prepared in Preparation Example A2 was used instead of the slurry material A1 prepared in Preparation Example A1, and the slurry material B2 prepared in Preparation Example B2 was used instead of the slurry material B1 prepared in Preparation Example B1, a laminated 2-layers reaction layer in which the reaction layer 101A (Pd layer) and the reaction layer 101B (Rh layer) were laminated sequentially, as shown in FIG. 4, was formed on the entire surface of on an inner wall of each of 36 cells 1a in a center portion of the honeycomb-shaped reaction vessel such that amount of each of the reaction layers coated was approximately 60 g per liter of the apparent capacity of the honeycomb-shaped reaction vessel. The reaction layers were not formed on inner walls of 24 cells in an outer peripheral portion of the honeycomb-shaped reaction vessel. Note that a width of the reaction layer and a pitch between the adjacent reaction layers in the laminated 2-layers reaction layer were both regarded as 0 mm conveniently.

The 24 cells in the outer peripheral portion and the 4 cells at the four corners inside the outer peripheral portion were cut from the honeycomb-shaped reaction vessel 1 in which the reaction layer 101A (Pd layer) and the reaction layer 101B (Rh layer) were formed as described above. Thus, a honeycomb-shaped reaction vessel including the laminated 2-layers reaction layer was obtained in which the reaction layer 101A (Pd layer) and the reaction layer 101B (Rh layer) were laminated sequentially on the entire surface of the inner wall of each of the 32 cells 1a, as shown in FIG. 4.

Comparative Example 4

In the same manner as in Comparative Example 2 except that in the in-cell application device shown in FIG. 2, the honeycomb-shaped reaction vessel 1 used was a monolithically formed honeycomb-shaped reaction vessel (cross-section: 10.0 mm×10.0 mm □, length: 50 mm, cell shape: quadrangle cells, cell density: 250 cpi, cell thickness: 6 mil, number of cells in cross-section: 60 cells which were left after 4 cells at four corners were cut from 8×8 cells), the slurry material A2 prepared in Preparation Example A2 was used instead of the slurry material A1 prepared in Preparation Example A1, and the slurry material B2 prepared in Preparation Example B2 was used instead of the slurry material B1 prepared in Preparation Example B1, a face-to-face 2-layers reaction layer in which the reaction layer 101A (Pd layer) and the reaction layer 101B (Rh layer) were arranged dividedly from each other in the inner-circumferential direction of the cell 1a and were each arranged linearly in the longitudinal direction of the cell 1a, as shown in FIG. 5, was formed on an inner wall of each of 36 cells 1a in a center portion of the honeycomb-shaped reaction vessel such that amount of each of the reaction layers coated was approximately 60 g per liter of the apparent capacity of the honeycomb-shaped reaction vessel. The reaction layers were not formed on inner walls of 24 cells in an outer peripheral portion of the honeycomb-shaped reaction vessel. Note that a width of the reaction layer and a pitch between the adjacent reaction layers in the face-to-face 2-layers reaction layer were both regarded as 50 mm conveniently.

The 24 cells in the outer peripheral portion and the 4 cells at the four corners inside the outer peripheral portion were cut from the honeycomb-shaped reaction vessel 1 in which the reaction layer 101A (Pd layer) and the reaction layer 101B (Rh layer) were formed as described above. Thus, a honeycomb-shaped reaction vessel including the face-to-face 2-layers reaction layer was obtained in which the reaction layer 101A (Pd layer) and the reaction layer 101B (Rh layer) were arranged on the entire surface of the inner wall of each of the 32 cells 1a dividedly from each other in the inner-circumferential direction of the cell 1a and were each arranged linearly in the longitudinal direction of the cell 1a, as shown in FIG. 5.

<Durability Test>

The honeycomb-shaped reaction vessels obtained in Examples 3-1 to 3-6 and Comparative Examples 3 and 4 were each placed in an electric furnace, and a durability test was conducted at 1050° C. for 20 hours, while a rich atmospheric gas [$H_2$ (2%)+$CO_2$ (10%)+$H_2O$ (3%, humidification by bubbling)+$N_2$ (the balance)] (5 minutes) and a lean atmospheric gas [$O_2$ (1%)+$CO_2$ (10%)+$H_2O$ (3%, humidification by bubbling)+$N_2$ (the balance)] (5 minutes) are being alternately allowed to flow at a gas flow rate of 500 ml/min per catalyst.

<Evaluation Test of Catalyst Performance>

While a stoichiometric gas having A/F=14.2 [$CO_2$ (10%)+$O_2$ (0.646%)+CO (0.933%)+NO (1200 ppm)+$C_3H_6$ (1600 ppmC)+$H_2O$ (10%)+$N_2$ (the balance)] was being allowed to flow at a gas flow rate of 22 L/min in the honeycomb-shaped reaction vessel after the 20-hour durability test, the catalyst inlet gas temperature was raised from 100° C. to 500° C. at a rate of temperature rise of 50° C./min. Next, a rich gas [CO (1.495%)+$CO_2$ (10%)+$O_2$ (0.646%)+CO (0.933%)+NO (1200 ppm)+$C_3H_6$ (1600 ppmC)+$H_2O$ (10%)+$N_2$ (the balance)] (5 seconds) and a lean gas [$O_2$ (0.748%)+$CO_2$ (10%)+$O_2$ (0.646%)+CO (0.933%)+NO (1200 ppm)+$C_3H_6$ (1600 ppmC)+$H_2O$ (10%)+$N_2$ (the balance)] were allowed to flow in an alternately switched manner for 5 minutes at a temperature of 500° C. and at a gas flow rate of 22 L/min. After that, while the stoichiometric gas (A/F=14.2) was being allowed to flow at a gas flow rate of 22 L/min, the catalyst inlet gas temperature was lowered to 100° C. by naturally cooling.

Next, while the stoichiometric gas (A/F=14.2) was being allowed to flow at a gas flow rate of 22 L/min, the catalyst inlet gas temperature was kept at 100° C. for 5 minutes. In this period, concentrations of CO, $C_3H_6$ and NO in a catalyst inlet gas were measured from 3 minutes to 5 minutes. These concentrations were employed as a baseline in calculation of removal ratio.

Figure 8:
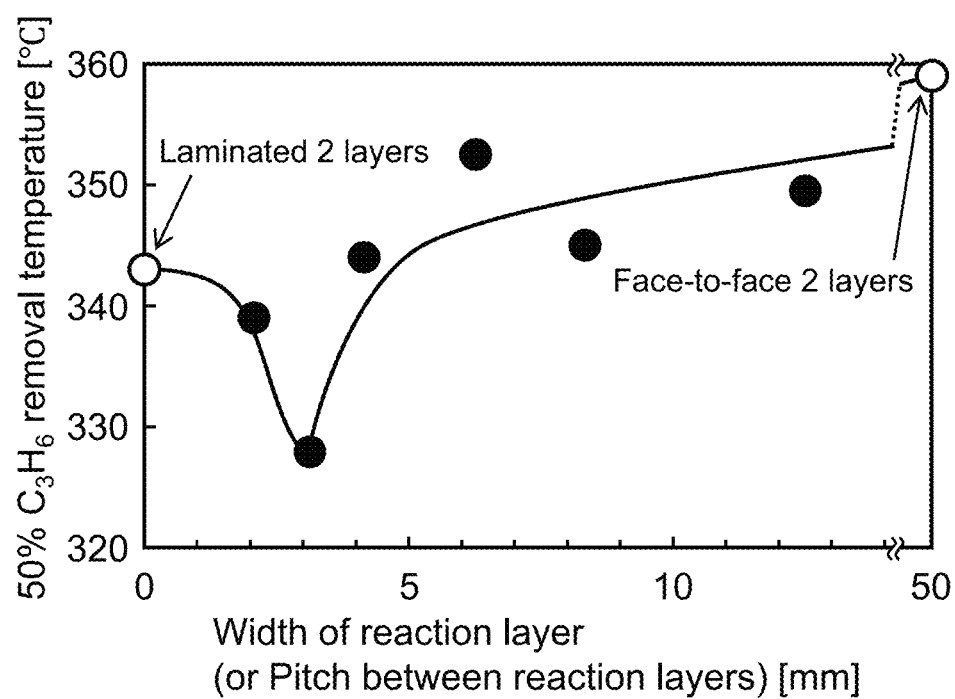
FIG. 8 is a graph showing a relationship between a width of a reaction layer (or a pitch between adjacent reaction layers) and a 50% $C_3H_6$ removal temperature.

Next, while the stoichiometric gas (A/F=14.2) was being allowed to flow at a gas flow rate of 22 L/min, the catalyst inlet gas temperature was raised from 100° C. to 600° C. at a rate of temperature rise of 25° C./min. In this period, concentrations of CO, $C_3H_6$ and NO in a catalyst outlet gas were measured. Removal ratios of CO, $C_3H_6$ and NO at various catalyst inlet gas temperatures were each calculated based on the concentrations of CO, $C_3H_6$ and NO in the catalyst inlet gas. Table 2 shows catalyst inlet gas temperature (50% removal temperature) at which each of the removal ratios of CO, $C_3H_6$ and NO became 50%. Note that Table 2 shows also the width of the reaction layer and the pitch between the adjacent reaction layers in various numbers of revolutions of the double helices based on the results obtained in Examples 2-1 to 2-6. FIG. 8 shows the result in which the 50% removal temperatures of $C_3H_6$ were plotted with respect to the width of the reaction layer (or the pitch between the adjacent reaction layers). Note that the 50% removal temperatures of $C_3H_6$ for the laminated 2-layers reaction layer and the face-to-face 2-layers reaction layer were conveniently plotted with respect to the widths of the reaction layer (or the pitches between the adjacent reaction layers) of 0 mm and 50 mm, respectively.

TABLE 2

| Reaction layer | Reaction layer Width [mm] *1 | Pitch [mm] *1 | 50% Removal temperature [° C.] CO | 50% Removal temperature [° C.] $C_3H_6$ | 50% Removal temperature [° C.] NO |
|---|---|---|---|---|---|
| Laminated 2 layers | 0 | 0 | 288 | 343 | 299 |
| 12-Rotated double helices | 2.08 | 2.08 | 278 | 339 | 287 |
| 8-Rotated double helices | 3.13 | 3.13 | 277 | 328 | 287 |
| 6-Rotated double helices | 4.17 | 4.17 | 286 | 344 | 294 |
| 4-Rotated double helices | 6.25 | 6.25 | 290 | 353 | 300 |
| 3-Rotated double helices | 8.33 | 8.33 | 284 | 345 | 293 |
| 2-Rotated double helices | 12.5 | 12.5 | 287 | 350 | 297 |
| Face-to-face 2 layers | 50 | 50 | 286 | 358 | 304 |

*1 Set value

As shown in Table 2 and FIG. 8, it was found that the double-helical reaction layer having a width (or pitch) of exceeding 0 mm and 12.5 mm or less (preferably 10 mm or less) possessed the lower 50% removal temperatures of $C_3H_6$ and NO, and exhibited higher catalyst performance after the durability test, compared with the face-to-face 2-layers reaction layer. Especially, it was found that the double-helical reaction layer having a width (or pitch) of 1 mm or more and 5 mm or less (preferably 2 mm or more and 4 mm or less, particularly preferably 2.5 mm or more and 3.5 mm or less) possessed the extremely lower 50% removal temperatures of $C_3H_6$ and NO (especially, 50% removal temperatures of $C_3H_6$), and had exceptional catalyst performance after the durability test, compared with the face-to-face 2-layers reaction layer and the laminated 2-layers reaction layer.

As described above, according to the present invention, it is possible to obtain a honeycomb-shaped reaction vessel which is less likely to undergo deterioration in a performance of a reaction layer, even when exposed to high temperature for a long period.

Accordingly, the honeycomb-shaped reaction vessel of the present invention is excellent in high temperature durability, and hence is useful as a honeycomb-shaped catalyst device used as a catalyst for purification of exhaust gas for an automobile or the like, a solid oxide fuel cell (SOFC) used for a fuel cell or the like, a cell for a secondary battery, a reaction vessel used for various synthesis apparatuses, or the like.

Reference Signs List

1: Honeycomb-shaped reaction vessel
1a: Cell of honeycomb-shaped reaction vessel 1
1b: Partition wall of honeycomb-shaped reaction vessel 1
2: Discharge tube
3, 3A, 3B: Material supply device
4, 4A, 4B: Material discharge outlet
5, 5A, 5B: Material flow path
6: End surface of honeycomb-shaped reaction vessel 1 on side where discharge tube 2 is inserted
7: End surface of honeycomb-shaped reaction vessel 1 on side opposite to end surface 6
8: Rotation shaft
101A: Reaction layer made of material A
101B: Reaction layer made of material B
102A: Removed excessive material A
102B: Removed excessive material B

What is claimed is:
1. A honeycomb-shaped reaction vessel, comprising:
a honeycomb-shaped substrate; and
a reaction layer arranged in at least a portion of an inner wall of a cell of the honeycomb-shaped substrate dividedly in a direction along an inner circumference on a cross-section perpendicular to a longitudinal direction from inlet end to outlet end of the cell and dividedly in a longitudinal direction from the inlet end to the outlet end of the cell.

2. The honeycomb-shaped reaction vessel according to claim 1, wherein
the reaction layer is arranged in the at least a portion of the inner wall of the cell of the honeycomb-shaped substrate helically in the longitudinal direction of the cell.

3. The honeycomb-shaped reaction vessel according to claim 2, wherein
a width of the reaction layer (a length in the longitudinal direction of the cell on a surface of the reaction layer) is exceeding 0 mm and 5 mm or less.

4. The honeycomb-shaped reaction vessel according to claim 2, wherein
the reaction layer comprises reaction layers of two or more types, and a pitch between adjacent reaction layers (a distance in the longitudinal direction of the cell between centers on surfaces of adjacent reaction layers) is exceeding 0 mm and 5 mm or less.

5. The honeycomb-shaped reaction vessel according to claim 2, wherein
the reaction layer comprises a catalyst material.

6. The honeycomb-shaped reaction vessel according to claim 1, wherein
the reaction layer comprises reaction layers of two or more types.

7. The honeycomb-shaped reaction vessel according to claim 6, wherein
the reaction layers of two or more types are arranged in the at least a portion of the inner wall of the cell of the honeycomb-shaped substrate multiple-helically in the longitudinal direction of the cell.

8. The honeycomb-shaped reaction vessel according to claim 1, wherein
a width of the reaction layer (a length in the longitudinal direction of the cell on a surface of the reaction layer) is exceeding 0 mm and 5 mm or less.

9. The honeycomb-shaped reaction vessel according to claim 1, wherein
the reaction layer comprises reaction layers of two or more types, and a pitch between adjacent reaction layers (a distance in the longitudinal direction of the cell between centers on surfaces of adjacent reaction layers) is exceeding 0 mm and 5 mm or less.

10. The honeycomb-shaped reaction vessel according to claim 1, wherein
the reaction layer comprises a catalyst material.

\* \* \* \* \*